United States Patent
Demichel (10) Patent No.: US 12,026,322 B2
(45) Date of Patent: Jul. 2, 2024

(54) METHOD FOR ACTIVATING A FUNCTION OF A VEHICLE BY ULTRA HIGH FREQUENCY WITH AN ITEM OF PORTABLE USER EQUIPMENT AND DEVICE FOR ACTIVATING AN ASSOCIATED FUNCTION

(71) Applicant: Continental Automotive GmbH, Hannover (DE)

(72) Inventor: Laurent Demichel, Toulouse (FR)

(73) Assignee: Continental Automotive GmbH, Hannover (DE)

( * ) Notice: Subject to any disclaimer, the term of this patent is extended or adjusted under 35 U.S.C. 154(b) by 290 days.

(21) Appl. No.: 17/614,072

(22) PCT Filed: Jun. 11, 2020

(86) PCT No.: PCT/EP2020/066195
§ 371 (c)(1),
(2) Date: Nov. 24, 2021

(87) PCT Pub. No.: WO2020/260033
PCT Pub. Date: Dec. 30, 2020

(65) Prior Publication Data
US 2022/0229498 A1  Jul. 21, 2022

(30) Foreign Application Priority Data
Jun. 24, 2019 (FR) .................................. 1906811

(51) Int. Cl.
*G06F 3/0346* (2013.01)
*B60R 16/023* (2006.01)
*G06F 3/038* (2013.01)

(52) U.S. Cl.
CPC .......... *G06F 3/0346* (2013.01); *B60R 16/023* (2013.01); *G06F 3/038* (2013.01)

(58) Field of Classification Search
CPC ..... G06F 3/0346; G06F 3/038; B60R 16/023; B60R 2325/101; B60R 2325/205;
(Continued)

(56) References Cited

U.S. PATENT DOCUMENTS

| 5,986,583 A | * | 11/1999 | Nakano | G01C 21/16 340/988 |
| 8,442,797 B2 | | 5/2013 | Kim et al. | |
| 2018/0342122 A1 | * | 11/2018 | Godet | H04B 17/27 |

FOREIGN PATENT DOCUMENTS

| CN | 102439404 A | | 5/2012 |
| CN | 102946488 | * | 2/2013 |

(Continued)

OTHER PUBLICATIONS

International Search Report and Written Opinion for International Application No. PCT/EP2020/066195, mailed Sep. 16, 2020, with partial English translation, 8 pages.
(Continued)

*Primary Examiner* — Muhammad Shafi
(74) *Attorney, Agent, or Firm* — Buchanan Ingersoll & Rooney PC (57) ABSTRACT

An ultra-high frequency-based method for activating a function of a vehicle with a portable item of user equipment having an accelerometer. The method including the following steps: Comparing signals from the accelerometer with a predetermined signature; Detecting a characteristic movement of the portable item of equipment, associated with a command to activate a function of the vehicle, performed by the user on the basis of the result of the comparison; Checking the establishment of ultra-high frequency communication between the portable item of equipment and the vehicle, i) If communication is established, then transmitting a command to activate the function of the vehicle to the vehicle in order to activate said function, ii) If not, if
(Continued)

communication is not established within a predetermined time interval following detection of the characteristic movement, then the method is stopped.

8 Claims, 3 Drawing Sheets

(58) Field of Classification Search
CPC .............. B60R 25/24; B60R 25/2045; H04M 1/72415; H04M 1/72454; H04W 4/48
USPC ......................................................... 701/36
See application file for complete search history.

(56) References Cited

FOREIGN PATENT DOCUMENTS

| | | | |
|---|---|---|---|
| CN | 103729056 | A | 4/2014 |
| FR | 2798691 | A1 | 3/2001 |
| FR | 2990815 | A1 | 11/2013 |
| FR | 3023314 | A1 | 1/2016 |
| FR | 3038768 | A1 | 1/2017 |
| FR | 3044497 | * | 6/2017 |
| FR | 3044497 | A1 | 6/2017 |
| JP | 2009127244 | A | 6/2009 |
| JP | 2015113574 | A | 6/2015 |
| JP | 2016038807 | A | 3/2016 |
| WO | 2018071671 | A2 | 4/2018 |
| WO | WO-2018/071671 | * | 4/2018 |
| WO | 2018121889 | A1 | 7/2018 |

OTHER PUBLICATIONS

International Search Report and Written Opinion for International Application No. PCT/EP2020/066195, mailed Sep. 16, 2020, 12 pages (French).
Chinese Office Action for Chinese Application No. 202080046005.1, dated Nov. 22, 2022 with translation, 28 pages.

* cited by examiner

METHOD FOR ACTIVATING A FUNCTION OF A VEHICLE BY ULTRA HIGH FREQUENCY WITH AN ITEM OF PORTABLE USER EQUIPMENT AND DEVICE FOR ACTIVATING AN ASSOCIATED FUNCTION

CROSS REFERENCE TO RELATED APPLICATIONS

This application is the U.S. National Phase Application of PCT International Application No. PCT/EP2020/066195, filed Jun. 11, 2020, which claims priority to French Patent Application No. 1906811, filed Jun. 24, 2019, the contents of such applications being incorporated by reference herein.

FIELD OF THE INVENTION

The invention relates to an ultra-high frequency-based method for activating a function of a motor vehicle with a portable item of user equipment, and to an associated device for activating a function.

The invention is applicable more particularly to "hands-free" access systems for accessing motor vehicles. What is known as a "hands-free" access system for accessing a motor vehicle allows an authorized user to lock and/or unlock the opening elements of his vehicle without having to physically press buttons on a key. For this purpose, the vehicle identifies a portable item of equipment such as a fob or remote control carried by the user or even a key, and if the fob or the remote control or else the key is located in a predetermined area around the vehicle or in the vehicle and is identified as belonging to the vehicle, then the vehicle automatically locks/unlocks its opening elements depending on the user's intention, without the user having to physically manipulate a key.

BACKGROUND OF THE INVENTION

This "hands-free" access system is known to those skilled in the art. It is generally composed of an electronic control unit on board the vehicle, one or more radiofrequency (LF) antennas located on the vehicle and an identification fob or remote control comprising an RF antenna, carried by the user.

An identifier exchange between the portable item of equipment and the vehicle via the RF antennas and the electronic control unit allows the vehicle to identify the portable item of equipment and makes it possible to trigger the locking or unlocking of the opening elements of the vehicle.

The identifier may be contained in a portable item of equipment other than a fob or a remote control; for example, it may be contained in a mobile telephone or smartphone carried by the user, or a watch worn by the user.

The identifier exchange is generally carried out via radiofrequency (RF) waves and via low-frequency (LF) waves. The vehicle firstly transmits, via the LF antennas, an LF interrogation signal and the portable item of equipment, if it is located within the reception area of said signal (that is to say a predetermined area around the vehicle), sends an RF presence message containing its identifier back to the vehicle.

The precise locating of the portable item of equipment around the vehicle is carried out by measuring the strength of the LF signal, originating from the vehicle, received by the portable item of equipment (via the antennas and the electronic control unit), which measurements are more commonly known as RSSI ("received signal strength indication" measurements, or measurement of the power of a signal received by an antenna at reception). The measurement of the power of the signal, originating from each LF antenna, received by the portable item of equipment is received and analyzed by a locating device on board the vehicle, which thereby determines the position of the portable item of equipment with respect to said LF antennas, that is to say with respect to the vehicle.

Depending on the location of the portable item of equipment identified by the vehicle, in said location areas, some actions specific to said location areas are carried out automatically: unlocking/locking or preliminary activation of the passenger compartment lighting system (also called "welcome lighting").

The RSSI measurement makes it possible to precisely locate the portable item of equipment in the location areas, that is to say around the vehicle, so as to make it possible not only to lock/unlock the opening elements, but also to start the vehicle, when the portable item of equipment is detected inside the vehicle.

If the portable item of equipment is a mobile telephone, RF (for example in the ISM bands) and LF (for example at 125 kHz) communication with the vehicle is not always possible, since most mobile telephones do not have any RF, or LF, communication means whose frequencies are compatible with those used during communication with a vehicle, such as the frequencies of 315 MHz and 433.92 MHz for RF and 125 kHz for LF.

On the other hand, mobile telephones now employ the Bluetooth® or Bluetooth Low Energy "BLE" communication standard, that is to say communication at ultra-high frequency (UHF) from 2402 MHz to 2480 MHz. This communication standard has the advantage of being universal and therefore does not require any accreditation specific to each country (only a "Bluetooth Low Energy" international certification), as is the case with the current RF and LF communication standards whose operating frequency differs according to country.

It therefore becomes necessary to adapt the "hands-free" access and/or starting system to a vehicle so that it is also able to operate with a mobile telephone equipped with the Bluetooth® communication standard and no longer solely by way of radio waves and low-frequency waves (RF, LF).

The advantage of the Bluetooth® communication standard is that it allows a long communication range of approximately 250 m around the vehicle. However, it does not allow the presence of the portable item of equipment to be detected precisely at shorter distances. The precise locating of the portable item of equipment around the vehicle, which was possible with the communication device from the prior art, operating based on an exchange through RF and LF waves, is no longer possible using Bluetooth®. Specifically, the RSSI measurement of a Bluetooth signal is very imprecise and varies greatly depending on the environment (noise, interference, reflections, etc.) and it is not possible to ascertain whether the portable item of equipment, whose position is fixed, is 5 m, 10 m, 40 m or more away from the vehicle.

Given the large variation in the RSSI of Bluetooth®, it is therefore no longer possible to precisely locate the position of the portable item of equipment in a close area around the authorized vehicle, in order for example to unlock the vehicle.

Figure 1:
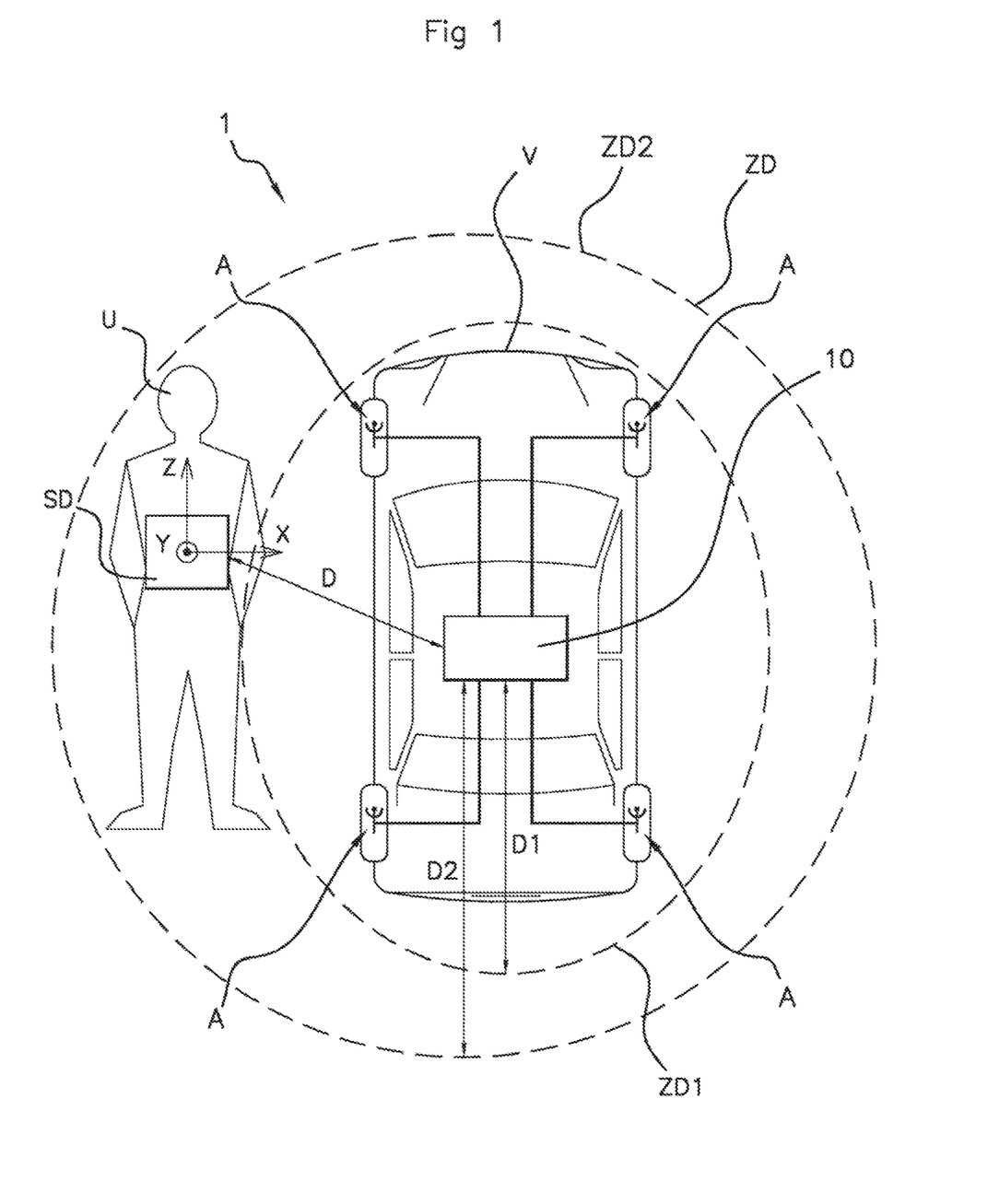

This is illustrated in FIG. 1. In FIG. 1, a user U carrying a portable item of user equipment SD is located in an area ZD2 away from his vehicle V, which area ZD2 does not allow remote unlocking of the opening elements of the vehicle V. A central control unit 10 on board the vehicle V receives, via BLE antennas 10 on board the vehicle V, one or more RSSI measurements of the BLE signal received by the portable item of equipment SD, transmitted beforehand by said antennas A. This BLE RSSI signal is subjected to strong interference by the environment, and the analysis of this signal by the control unit 10 is distorted and the control unit 10 locates the portable item of equipment SD in a close area ZD1 around the vehicle (located at a distance D1 from the control unit 10), which area ZD1 authorizes remote unlocking of the opening elements of the vehicle V. The vehicle V is then unlocked, while the user is away from his vehicle V and is located in a further-away area ZD2 that has a larger radius D2 around the vehicle V. This constitutes a major drawback for the safety of the user's property, since there is a risk of the vehicle being stolen, or of property located in the vehicle V being stolen.

It is therefore not possible to robustly and repeatably activate a function of the vehicle, such as locking/unlocking the vehicle, using Bluetooth® communication.

One solution from the prior art consists for example in increasing the number of BLE antennas on the vehicle. However, this does not make it possible to achieve the desired accuracy in terms of locating the portable item of user equipment SD.

Another solution consists in coupling the locating of the portable item of equipment that is carried out through BLE communication with the detection of an intentional action by the user on the vehicle, for example detecting the approach of the user's hand close to a capacitive sensor located in an area of the vehicle door handle dedicated to unlocking (and respectively to locking). However, the major drawbacks of this solution are the cost, due to the multiplicity of detection devices, and the inability to activate locking/unlocking of the vehicle remotely, since the user has to be close to the handle.

SUMMARY OF THE INVENTION

An aspect of the invention proposes an ultra-high frequency communication-based method for activating a function of a vehicle with a portable item of user equipment and an associated device for activating a function that make it possible to overcome these drawbacks.

In this case, an aspect of invention proposes a method for activating a function through ultra-high frequency waves in order to remotely activate a function of the vehicle, such as the remote unlocking/locking of the opening elements, which method is inexpensive, ergonomic and robust.

An aspect of the invention proposes an ultra-high frequency-based method for activating a function of a vehicle with a portable item of user equipment comprising an accelerometer, said method being noteworthy in that it comprises the following steps:
  a. Comparing signals from the accelerometer with a predetermined signature,
  b. Detecting a characteristic movement of the portable item of equipment, associated with a command to activate a function of the vehicle, performed by the user on the basis of the result of the comparison,
  c. Checking the establishment of ultra-high frequency communication between the portable item of equipment and the vehicle,
    i. If communication is established, then transmitting a command to activate the function of the vehicle to the vehicle in order to activate said function,
    ii. If not, if communication is not established within a predetermined time interval following detection of the characteristic movement, then the method is stopped.

Advantageously, the comparison is performed between a value derived from a resulting acceleration from the accelerometer signals transmitted along three mutually orthogonal axes and a maximum value.

Preferably, the derived value consists of a maximum value of the resulting acceleration over a predetermined duration, or of an integral of the resulting acceleration over time over a predetermined duration.

An aspect of the invention also relates to any computer program product comprising a set of program code instructions that, when they are executed by one or more processors, configure the one or more processors so as to implement an activation method according to any of the features listed above.

An aspect of the invention is also applicable to any portable item of user equipment comprising an accelerometer, an ultra-high frequency communication antenna and ultra-high frequency transmission and reception means, furthermore comprising analysis means for analyzing the signals from the accelerometer and comparison means for comparing them with a predetermined signature; and determination means for determining a characteristic movement associated with a command to activate a function of the vehicle depending on the result of said comparison.

The analysis and comparison means comprise for example calculating a resulting acceleration and a value derived from said resulting acceleration for a predetermined duration and comparison means for comparing said derived value with a maximum value.

An aspect of the invention also relates to any device for activating a vehicle function intended to be housed on board a vehicle, comprising at least one ultra-high frequency communication antenna and a control unit equipped with ultra-high frequency transmission and reception means, said device being noteworthy in that it furthermore comprises unlocking/locking means for performing unlocking/locking on the basis of the data received by the antenna from the portable item of user equipment.

Advantageously, the received data comprise a command to activate a function of the vehicle based on detection of a characteristic movement of the portable item of equipment.

Finally, an aspect of the invention relates to any motor vehicle comprising an activation device (D') according to any one of the features of the device listed above.

BRIEF DESCRIPTION OF THE DRAWINGS

Further features and advantages of aspects of the invention will become more clearly apparent from reading the following description. This description is purely illustrative and should be read with reference to the accompanying drawings, in which:

FIG. 1, already explained above, schematically shows a system comprising a vehicle V and a portable item of user equipment SD according to the prior art, FIG. 2 comprises, in its upper part, a graph depicting the variations of signals supplied by the accelerometer of the portable item of equipment over time during a characteristic movement of said item of equipment aimed at unlocking the opening elements of the vehicle, and in its lower part, a graph depicting the status of the BLE communication between the control unit and the portable item of user equipment on the same time scale and for three scenarios: a first scenario for which BLE communication is established and maintained during the characteristic movement, a second scenario for which BLE communication is established and then lost during the characteristic movement, and then a third scenario for which BLE communication is established within a certain period after the characteristic movement, FIG. 3 schematically shows the portable item of equipment and the control unit on board the vehicle according to an aspect of the invention.

DESCRIPTION OF THE EMBODIMENTS

As explained above, the remote activation of a vehicle function, such as unlocking/locking the opening elements of the vehicle V, based on analyzing the power of the BLE signal (RSSI signal) received by the portable item of user equipment SD and transmitted beforehand by the antennas A on board the vehicle, is not reliable. In this case, the unlocking of the opening elements may be triggered inadvertently, without the control or intention of the user.

An aspect of the invention therefore proposes a method for activating a function of the vehicle through BLE, making it possible to ensure the user's control and security, and an associated portable item of user equipment and an associated activation device.

The portable item of user equipment SD' according to an aspect of the invention (cf. FIG. 3), such as a smartphone, comprises a BLE communication antenna A' and BLE transmission and reception means M1, allowing communication with the vehicle V, and an accelerometer ACC. Said accelerometer ACC measures acceleration in three dimensions, $ACC_X$, $ACC_Y$, $ACC_Z$ along three mutually orthogonal axes X, Y, Z. This is known from the prior art.

Figure 3:
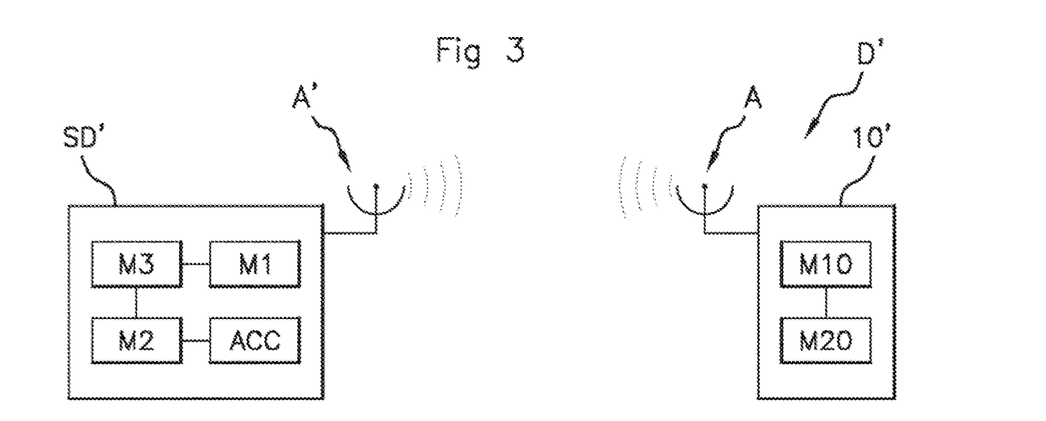

The item of user equipment SD' according to an aspect of the invention furthermore comprises
a. analysis means M2 for analyzing signals from the accelerometer ACC, and comparison means for comparing them with a predetermined signature,
b. determination means for determining a characteristic movement M3, associated with a command to activate a function of the vehicle, depending on the result of said comparison.

The analysis and comparison means M2 comprise calculation means for calculating a resulting acceleration $ACC_R$ based on the acceleration measurements performed along the three axes $ACC_X$, $ACC_Y$, $ACC_Z$, and a value derived from the resulting acceleration $ACC_D$, for example the maximum value of the resulting acceleration or the value of the integration of the resulting acceleration with respect to time.

Said means M2 compare the value derived from the resulting acceleration $ACC_D$ with a threshold ACCmax.

The activation device D' on board a vehicle V comprises at least one BLE communication antenna A and a control unit 10'. Said control unit 10' is connected to said one antenna A located on the vehicle V. The control unit 10' comprises transmission and reception means M10 for transmitting and receiving data transmitted and received by said antenna A, making it possible to communicate with the portable item of user equipment SD using BLE. This is known from the prior art and will not be described in more detail here.

The control unit 10' according to an aspect of the invention furthermore comprises unlocking/locking means M20 for performing unlocking/locking on the basis of the data received by the antenna A, originating from the portable item of user equipment SD'. In this case, as described below, the data comprise a command to activate a function of the vehicle, based on the determination of a characteristic movement of the portable item of equipment SD', said determination being performed by the portable item of equipment SD'.

The method for activating a vehicle function, illustrated in FIG. 4, will now be described.

Figure 4:
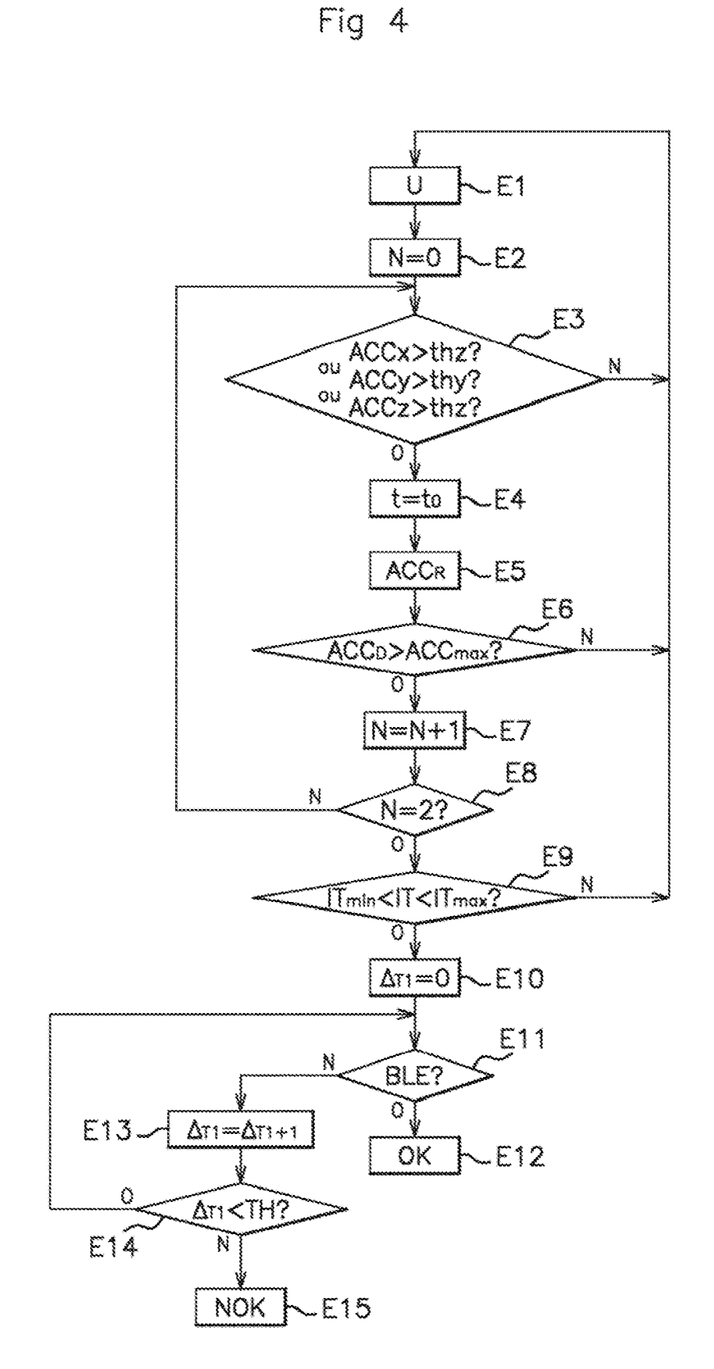
FIG. 4 is a flowchart schematically showing the method for activating a vehicle function according to an aspect of the invention.

In a preliminary step, not illustrated in FIG. 4, the portable item of user equipment SD' and the activation device D' are kitted out according to an aspect of the invention and as described above.

In a first step E1, the user U, equipped with his portable item of equipment SD', approaches the vehicle V, and an attempt to communicate between said item of equipment SD' and the vehicle V using BLE communication may then be made. This attempt to communicate is made in accordance with the BLE protocol known to those skilled in the art, and comprises an "advertising" mode that makes it possible to recognize a nearby compatible item of equipment followed, where appropriate, by a connected mode that makes it possible to exchange data with said item of equipment.

If the user U wishes to unlock his vehicle, he then performs, according to an aspect of the invention, a characteristic movement with his portable item of equipment SD'; for example, he taps twice on his item of equipment SD' within a predetermined time interval. These two successive impacts are measured by the accelerometer ACC of the portable item of equipment SD' along the three mutually orthogonal axes X, Y, Z.

The signals from the accelerometer, representative of the two successive impacts made by the user on the portable item of equipment SD', are analyzed in the following steps and compared with a predetermined signature, as described below.

In a second step E2, an impact counter N is initialized at zero.

In a third step E3, the measurements of the accelerations along the three axes $ACC_X$, $ACC_Y$, $ACC_Z$ are each compared, respectively, with a threshold value Thx, Thy, Thz. If one of the three measurements is greater than its respective threshold, if for example the acceleration measurement along the Z axis, that is to say $ACC_Z$, is greater than a threshold Thz, at the time t=t0, then the method enters into impact detection mode and the following steps are implemented.

In the fourth step E4, the time at which the threshold Thz of the acceleration measurement $ACC_Z$ along the Z axis is exceeded is stored, that is to say t=t0.

In the fifth step E5, starting from the time t0, the resulting acceleration value $ACC_R$ along the 3 axes is calculated, that is to say:

[Math 1]

$$ACC_R \sqrt{((ACC_X)^2 + (ACC_Y)^2 + (ACC_Z)^2)}$$

Where:
ACCX: measurement of acceleration along the X axis,
ACCY: measurement of acceleration along the Y axis,
ACCZ: measurement of acceleration along the Z axis.

In a sixth step E6, a value derived from the resulting acceleration value $ACC_D$, calculated over a predetermined duration LT, is compared with a maximum value ACCmax.

The derived value may for example be the maximum value of the resulting acceleration calculated over the predetermined duration LT, or the value of the integral of the resulting acceleration with respect to time t over the predetermined duration LT. The predetermined duration LT was determined beforehand in the calibration phase and represents a typical value of the duration of an impact, for example an average duration of an impact, measured by the accelerometer ACC.

Either the maximum value or the integral is compared with a threshold ACCmax (the values of ACCmax are different depending on whether comparing the maximum value or the integral). If this derived value $ACC_D$ is greater than a maximum value ACCmax, then an impact is detected on the portable item of equipment SD' and the impact counter is incremented by one (step E7). It should be noted that step E3 is optional, and it could in fact be contemplated to continuously calculate the value derived from the resulting acceleration $ACC_D$ and to compare it with two thresholds, a first threshold that indicates the presence of the start of an impact and another that indicates the presence of the end of the impact.

As long as the counter N has not reached a predetermined value, for example N=2 (Step E8), if the characteristic movement requires two successive impacts from the user on his portable item of equipment SD', then steps E3 to E7 are repeated in order to detect the presence of a second impact.

When the impact counter has reached N=2, then it is checked, in a ninth step E9, that the time interval IT between the two successive impacts thus detected is within a range of predetermined values, that is to say $$IT_{min} < IT < ITmax \quad \text{[Math 3]}$$

Where $$IT = t2 - t0$$

t0: first time of the acceleration measurement $ACC_Z$ exceeding a threshold Thz, t2: second time of the acceleration measurement $ACC_Z$ exceeding a threshold Thz.

$IT_{max}$: predetermined maximum value of the time interval between the two successive impacts $IT_{min}$: predetermined minimum value of the time interval between the two successive impacts.

Of course, any type of predetermined signature of the acceleration measurements from the accelerometer ACC, representing two or three successive impacts or any other characteristic movement, and any comparison means for comparing the accelerometer signals with a predetermined signature that are known to those skilled in the art, may be contemplated here. The above comparison, based on the resulting acceleration, its maximum value or its integral is given only by way of wholly non-limiting example.

If the time interval IT is within the range of predetermined values $T_{min}$, $T_{max}$ and if the impact counter is equal to 2, then it is detected that the user has performed the characteristic movement associated with a command to activate a function of the vehicle V and that he wishes for example to unlock the opening elements of his vehicle V. A first time counter $\Delta T1$ is then initialized to zero (step E10). There may of course be a plurality of predetermined characteristic movements stored in the portable item of equipment SD', each characteristic movement corresponding to a command to activate a function of the vehicle V, such as for example: preheating the seats, presetting radio stations, etc.

In the following step (step E11), a BLE connection check is performed. If BLE communication is established between the portable item of equipment SD' and the vehicle V, then a command to activate a function of the vehicle V, for example unlocking of the driver's door, is sent by the portable item of equipment SD' to the vehicle V so that said vehicle unlocks the opening elements (step E12).

If BLE communication cannot be established, then the time counter $\Delta T1$ is incremented, that is to say:

$$\Delta T1 = \Delta T1 + 1. \quad \text{[Math 4]}$$

This time counter is incremented for example every x ms, where x=1, wherein, after each increment, and if the counter $\Delta T1$ has not reached a predetermined time interval TH, the BLE communication status is checked (steps E13, E14, E11).

If, at the end of the predetermined interval $\Delta TH1=TH$, BLE communication was not able to be established, then the method stops (step E15).

On the other hand, if BLE communication was able to be established during this predetermined interval, located after the detection of the characteristic movement, then the command to activate the function of the vehicle is sent (step E12) by the portable item of equipment SD' to the vehicle V so that said vehicle unlocks the opening elements.

Figure 2:
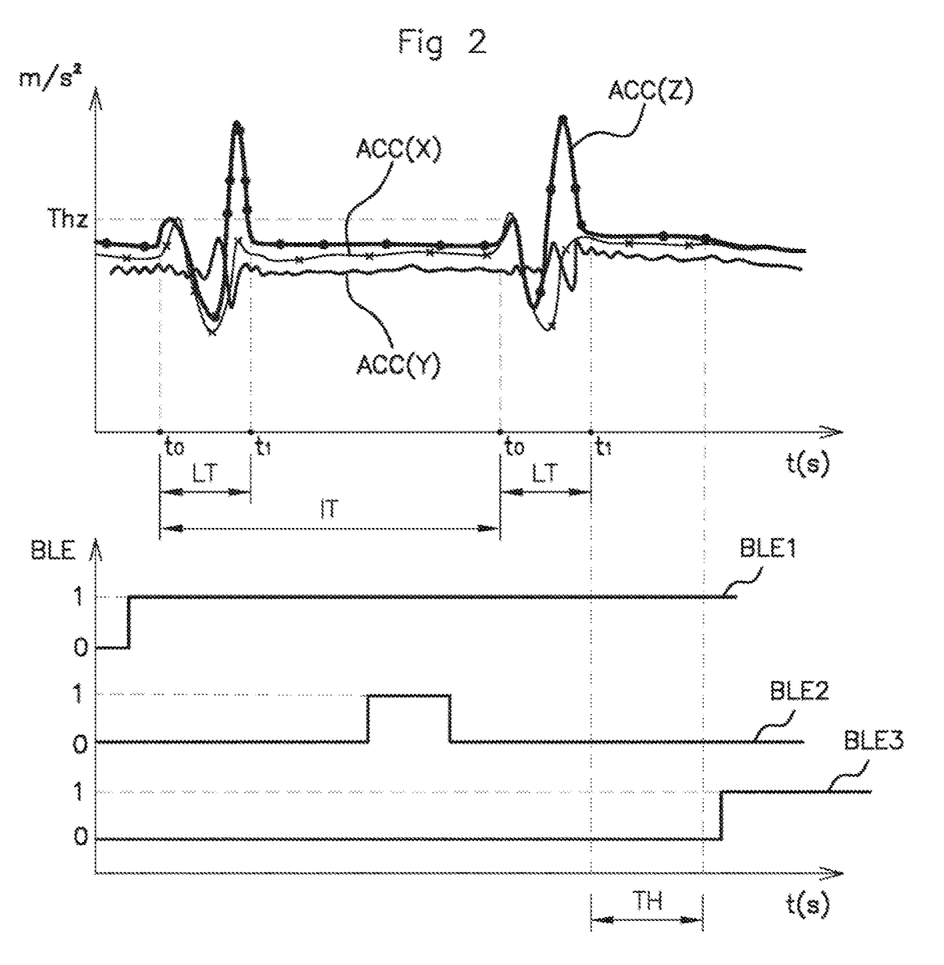

This is illustrated at the bottom of FIG. 2, which comprises a graph depicting the status of the BLE communication between the control unit 10' and the portable item of user equipment SD' on the same time scale t and for three scenarios: a first scenario BLE1 for which BLE communication is established (BLE=1) and maintained during the characteristic movement, a second scenario BLE2 for which BLE communication is established and then lost (BLE=0) during the characteristic movement, and then a third scenario BLE3 for which BLE communication is established in the interval TH after the characteristic movement.

For the first scenario BLE1, following detection of the characteristic movement, the unlocking activation command is transmitted to the vehicle V', and said vehicle, upon receiving the information, unlocks the opening elements.

For the second scenario BLE2, since no connection is established at the time of detection of the characteristic movement, and is also not established during the predetermined time interval following detection of the characteristic movement, no command is sent to the vehicle V and the opening elements are not unlocked.

For the third scenario BL3, with the BLE connection being established during the predetermined time interval $\Delta TH1=TH$, the command to activate the vehicle function is sent to the vehicle V, and said vehicle unlocks the opening elements.

An aspect of the invention therefore cleverly makes it possible to activate a vehicle function, such as unlocking or locking the opening elements, using ultra-high frequency communication without having to precisely locate the portable item of equipment around the vehicle. In addition, an aspect of the invention expediently uses the accelerometer that is already present in the portable item of equipment in order to detect a characteristic movement of the portable item of equipment performed intentionally by the user who wishes to unlock his vehicle. The use of a time delay in the check on the BLE communication following detection of the characteristic movement makes it possible to overcome interference that inadvertently impacts BLE communication.

Lastly, an aspect of the invention is simple, inexpensive and ergonomic.

The invention claimed is:

1. An ultra-high frequency-based method for activating a function of a vehicle with a portable item of user equipment comprising an accelerometer, said method comprising:
   a) detecting a characteristic movement of the portable item of equipment associated with a command to activate a function of the vehicle, the characteristic movement consisting of a predetermined value of successive taps by the user on the portable item of equipment within a predetermined time interval;
   b) measuring the successive taps by the user on the portable item of equipment by the accelerometer;
   c) comparing signals from the accelerometer representative of the measured successive taps by the user on the portable item of equipment with a predetermined signature; and
   d) checking the establishment of ultra-high frequency communication between the portable item of equipment and the vehicle,
      i) If communication is established, then transmitting a command to activate the function of the vehicle to the vehicle in order to activate said function,
      ii) If communication is not established within the predetermined time interval following detection of the characteristic movement, then the method is stopped.

2. The activation method as claimed in claim 1, wherein the comparison is performed between a value derived from a resulting acceleration from the accelerometer signals transmitted along three mutually orthogonal axes and a maximum value.

3. The activation method as claimed in claim 1, wherein the derived value consists of a maximum value of the resulting acceleration over a predetermined duration, or of an integral of the resulting acceleration over time over a predetermined duration.

4. A non-transitory computer program product, comprising a set of program code instructions that, when they are executed by one or more processors, configure the one or more processors so as to implement an ultra-high frequency-based method for activating a function of a vehicle with a portable item of user equipment comprising an accelerometer, said method comprising:
   a) detecting a characteristic movement of the portable item of equipment associated with a command to activate a function of the vehicle, the characteristic movement consisting of a predetermined value of successive taps by the user on the portable item of equipment within a predetermined time interval;
   b) measuring the successive taps by the user on the portable item of equipment by the accelerometer;
   c) comparing signals from the accelerometer representative of the measured successive taps by the user on the portable item of equipment with a predetermined signature; and
   d) checking the establishment of ultra-high frequency communication between the portable item of equipment and the vehicle,
      i) If communication is established, then transmitting a command to activate the function of the vehicle to the vehicle in order to activate said function,
      ii) If communication is not established within the predetermined time interval following detection of the characteristic movement, then the method is stopped.

5. A portable item of user equipment comprising:
   an ultra-high frequency communication antenna;
   ultra-high frequency transmission and reception means;
   determination means for determining a characteristic movement associated with a command to activate a function of the vehicle, the characteristic movement consisting of a predetermined value of successive taps by the user on the portable item of user equipment within a predetermined time interval;
   an accelerometer configured to measure the successive taps by the user on the portable item of user equipment and generate signals representative of the measured successive taps by the user on the portable item of user equipment;
   analysis means configured to analyze the signals from the accelerometer; and
   comparison means for comparing the analyzed signals from the accelerometer with a predetermined signature.

6. The portable item of user equipment as claimed in claim 5, wherein the analysis and comparison means comprise calculating a resulting acceleration and a value derived from said resulting acceleration and comparison means for comparing said derived value with a maximum value.

7. A device for activating a vehicle function intended to be housed on board a vehicle, the device comprising:
   at least one ultra-high frequency communication antenna;
   a control unit equipped with ultra-high frequency transmission and reception means; and
   unlocking/locking means for performing unlocking/locking on the basis of the data received by the antenna from the portable item of user equipment,
   wherein the received data comprise a command to activate a function of the vehicle, based on detection of a characteristic movement of the portable item of equipment, the characteristic movement consisting of a predetermined value of successive taps by the user on the portable item of equipment, and
   wherein the portable item of user equipment comprises an accelerometer configured to measure the successive taps by the user on the portable item of user equipment and generate signals representative of the measured successive taps by the user on the portable item of user equipment.

8. A motor vehicle, comprising a device for activating a vehicle function intended to be housed on board a vehicle, the device comprising:
   at least one ultra-high frequency communication antenna;
   a control unit equipped with ultra-high frequency transmission and reception means;
   and unlocking/locking means for performing unlocking/locking on the basis of the data received by the antenna from the portable item of user equipment,
   wherein the received data comprise a command to activate a function of the vehicle, based on detection of a characteristic movement of the portable item of equipment, the characteristic movement consisting of a predetermined value of successive taps by the user on the portable item of equipment, and
   wherein the portable item of user equipment comprises an accelerometer configured to measure the successive taps by the user on the portable item of user equipment and generate signals representative of the measured successive taps by the user on the portable item of user equipment.

\* \* \* \* \*